(12) United States Patent
Daiku

(10) Patent No.: US 11,947,139 B2
(45) Date of Patent: Apr. 2, 2024

(54) AERIAL DISPLAY APPARATUS

(71) Applicant: TOPPAN PRINTING CO., LTD., Tokyo (JP)

(72) Inventor: Yasuhiro Daiku, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 764 days.

(21) Appl. No.: 17/079,321

(22) Filed: Oct. 23, 2020

(65) Prior Publication Data

US 2021/0041719 A1 Feb. 11, 2021

Related U.S. Application Data

(63) Continuation of application No. PCT/JP2019/013796, filed on Mar. 28, 2019.

(30) Foreign Application Priority Data

Apr. 25, 2018 (JP) .................................. 2018-083787

(51) Int. Cl.
*G02B 5/124* (2006.01)
*G02B 5/00* (2006.01)
(Continued)

(52) U.S. Cl.
CPC .............. *G02B 5/124* (2013.01); *G02B 5/003* (2013.01); *G02B 5/08* (2013.01); *G02B 30/56* (2020.01)

(58) Field of Classification Search
None
See application file for complete search history.

(56) References Cited

U.S. PATENT DOCUMENTS 6,064,423 A * 5/2000 Geng ..................... G02B 30/54
348/E13.058
2002/0149721 A1* 10/2002 Minoura ............... G02F 1/1677
349/113

(Continued)

FOREIGN PATENT DOCUMENTS

JP 2001-215444 A 8/2001
JP 2012-163701 8/2012

(Continued)

OTHER PUBLICATIONS

First Office Action dated Oct. 18, 2022 in corresponding Japanese Patent Application No. 2018-083787 (4 pages) (4 pages English Translation).

(Continued)

*Primary Examiner* — Robert E. Tallman
(74) *Attorney, Agent, or Firm* — STAAS & HALSEY LLP

(57) ABSTRACT

An aerial display apparatus includes: a display device which displays an image; a mirror device which includes a plurality of optical elements each including two reflective surfaces that are orthogonally disposed, which reflects display light from the display device, and which forms an aerial image at a position that is plane-symmetrical to the display device; and a light shielding member which is disposed on an optical path between the display device and the aerial image, which includes an opening that allows a portion of incident light to pass through, and which shields light incident on a region other than the opening.

14 Claims, 16 Drawing Sheets

(51) Int. Cl.
    *G02B 5/08*        (2006.01)
    *G02B 30/56*     (2020.01)

(56) References Cited

U.S. PATENT DOCUMENTS

| | | | | |
|---|---|---|---|---|
| 2010/0110384 | A1* | 5/2010 | Maekawa | G03B 35/18 |
| | | | | 353/10 |
| 2011/0181949 | A1* | 7/2011 | Hashikawa | H04N 13/346 |
| | | | | 359/463 |
| 2014/0253880 | A1 | 9/2014 | Yoneno | |
| 2017/0261759 | A1 | 9/2017 | Yamamoto | |
| 2018/0039090 | A1 | 2/2018 | Haruyama et al. | |
| 2019/0179160 | A1* | 6/2019 | Ito | G02B 30/56 |

FOREIGN PATENT DOCUMENTS

| | | |
|---|---|---|
| JP | 2013-257529 | 12/2013 |
| JP | 2014-106354 | 6/2014 |
| JP | 2014-126683 | 7/2014 |
| JP | 2015-166845 A | 9/2015 |
| JP | WO 2016/088683 A1 | 6/2016 |
| JP | 2016-126285 | 7/2016 |
| JP | 5997606 B2 * | 9/2016 |
| JP | 2017-67933 | 4/2017 |
| JP | 2017-138357 | 8/2017 |
| JP | 2019-105744 A | 6/2019 |
| WO | 2009/136578 | 11/2009 |
| WO | 2017-018204 | 2/2017 |
| WO | WO 2017/125984 A1 | 7/2017 |

OTHER PUBLICATIONS

Written Opinion of the International Searching Authority, including English translation of the Written Opinion of ISA (Jun. 11, 2019)—International Preliminary Report on Patentability (PCT/IB/237), English Translation dated Nov. 5, 2020, in corresponding International Patent Application No. PCT/JP2019/013796.
First Office Action dated Jul. 19, 2022 in corresponding Japanese Patent Application No. 2018-083787 (4 pages) (4 pages English Translation).
International Search Report for corresponding PCT/JP2019/013796, dated June 11, 2019.
Extended European Search Report dated Jan. 12, 2022 in European Patent Application No. 19792774.2 (9 pages).

\* cited by examiner

AERIAL DISPLAY APPARATUS

CROSS-REFERENCE TO RELATED APPLICATIONS

This application is a Continuation Application of PCT Application No. PCT/JP2019/013796, filed Mar. 28, 2019, and based upon and claiming the benefit of priority from Japanese Patent Application No. 2018-083787, filed Apr. 25, 2018, the entire contents of all of which are incorporated herein by reference.

FIELD

The present invention relates to an aerial display apparatus.

BACKGROUND

A dihedral corner reflector array has been proposed in which real mirror-image forming optical systems (dihedral corner reflectors) that form a real image of an observation target in a space of the observer side are disposed in an array as basic components to allow observation of a real image of an observation target formed in the air (see Patent Document 1). Consideration has been given to application of a display device that uses a mirror device such as a dihedral corner reflector array to a non-contact input device (button) in the fields of medicine and food, in combination with an infrared touch panel, as well as amusement.

CITATION LIST

Patent Literature

Patent Document 1: Jpn. Pat. Appln. KOKAI Publication No. 2017-67933
Patent Document 2: International Publication No. 2009/136578

SUMMARY

According to an aspect of the present invention, there is provided an aerial display apparatus comprising:
a display device which displays an image;
a mirror device which includes a plurality of optical elements each including two reflective surfaces that are orthogonally disposed, which reflects display light from the display device, and which forms an aerial image at a position that is plane-symmetrical to the display device; and
a light shielding member which is disposed on an optical path between the display device and the aerial image, which includes an opening that allows a portion of incident light to pass through, and which shields light incident on a region other than the opening.

According to an aspect of the present invention, there is provided an aerial display apparatus, comprising:
a display device which displays an image;
a mirror device which includes a plurality of optical elements each including two reflective surfaces that are orthogonally disposed, which reflects display light from the display device, and which forms an aerial image at a position that is plane-symmetrical to the display device; and
a light limiting device which is disposed on an optical path between the display device and the aerial image, and which allows a light component of incident light having an angle of emission that falls within a predetermined range to be transmitted therethrough.

DETAILED DESCRIPTION

Figure 1:
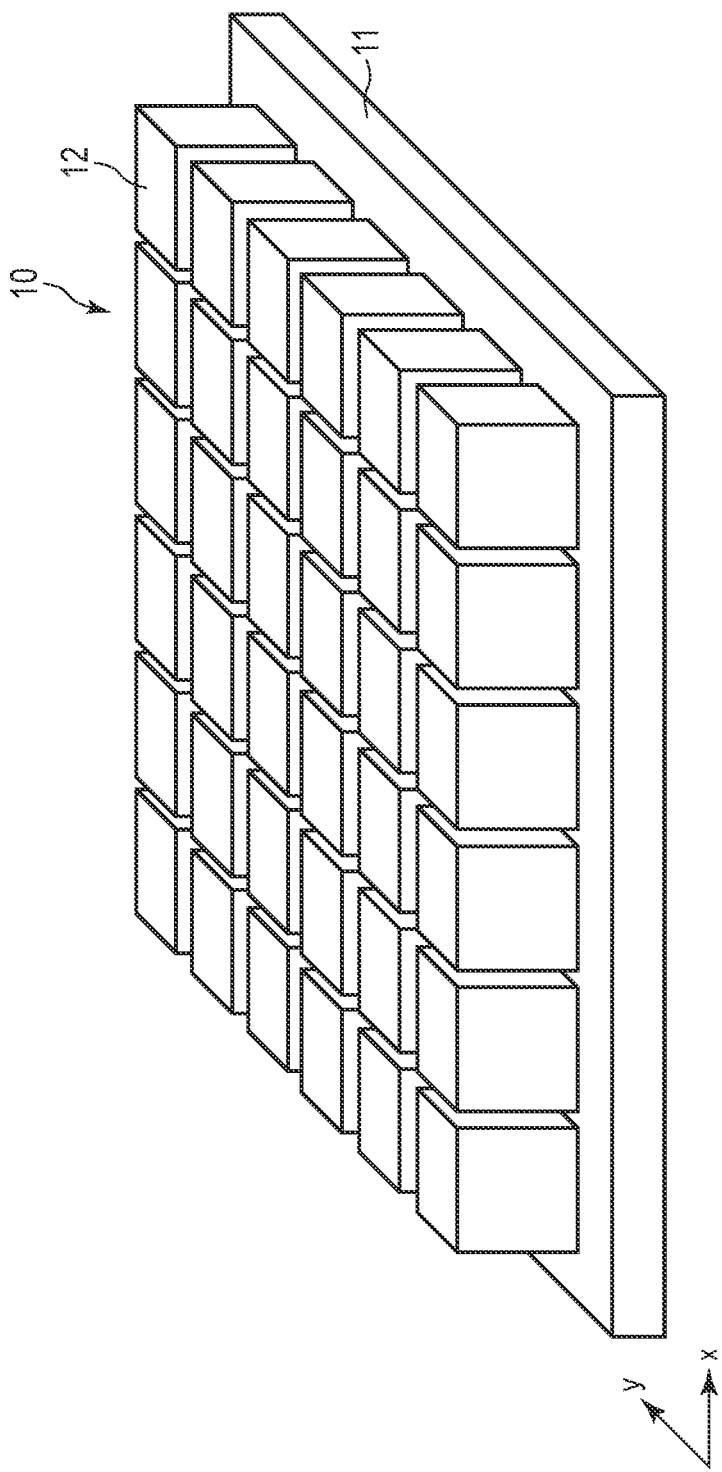
FIG. 1 is a perspective view of a mirror device.

Hereinafter, embodiments will be described with reference to the drawings. The drawings are schematic or conceptual, and the dimensions, ratios, and the like of each drawing are not necessarily the same as the actual ones. Even when the same portions are shown in the drawings, the dimensional relationship and the ratio may be different. In particular, several embodiments described below exemplify an apparatus and a method for embodying the technical idea of the present invention, and the technical idea of the present invention is not specified by the shape, structure, arrangement, or the like of the components. In the following description, elements having the same function and configuration will be denoted by the same reference numerals, and redundant descriptions will be made only when necessary.

[1] First Embodiment

[1-1] Principle of Aerial Display Apparatus

An aerial display apparatus is configured, for example, to form an image of light emitted from a display surface of a liquid crystal display, using an aerial imaging device (mirror device) such as a dihedral corner reflector.

A configuration of a mirror device 10 used in an aerial display apparatus will be described. FIG. 1 is a perspective view of the mirror device 10.

The mirror device 10 includes a planar base member 11 and a plurality of optical elements 12 provided on the base member 11. The optical elements 12 are arranged, for example, in a matrix so as to extend in an x direction and a y direction that are orthogonal to each other. Each of the optical elements 12 has two reflective surfaces that are orthogonally disposed. Each optical element 12 has a cubic or rectangular parallelepiped shape. The base member 11 and the optical elements 12 are configured of a transparent resin.

In FIG. 1, 36 (=6×6) optical elements 12 are shown as an example; however, in actuality, a greater number of optical elements 12 are disposed. The number and size of the optical elements 12 can be freely set according to the specification of the aerial display apparatus. A distance between two optical elements 12 can be freely set according to the specification of the aerial display apparatus.

Figure 2:
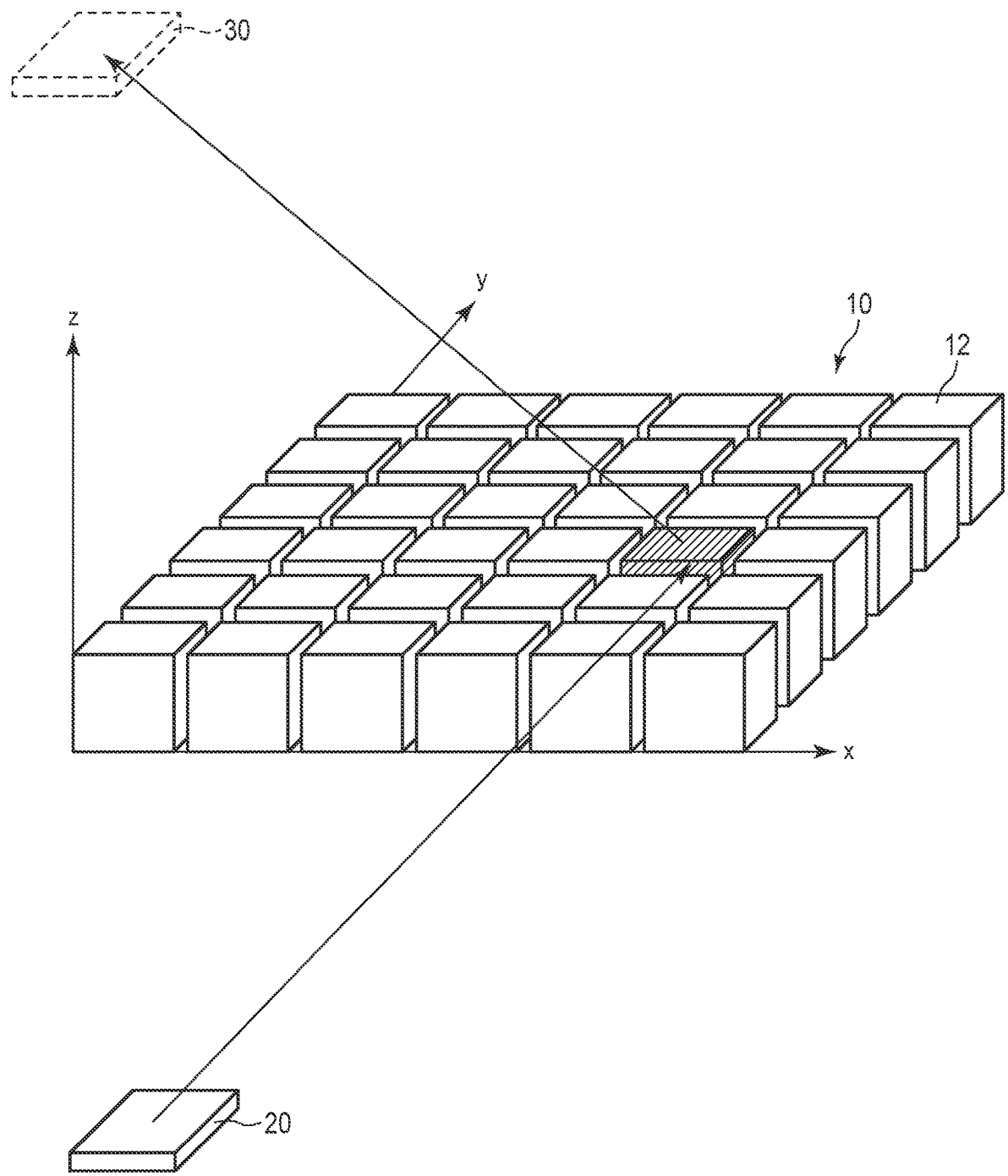
FIG. 2 is a schematic diagram illustrating a principle of an aerial display apparatus.

FIG. 2 is a schematic diagram illustrating the principle of the aerial display apparatus. The aerial display apparatus includes a display device 20 that displays an image on a display surface and a mirror device 10. In FIG. 2, the base member 11 of the mirror device 10 is not illustrated, and only the optical elements 12 are extracted for illustration, for the ease of understanding of the drawing. The optical elements 12 are arranged on an x-y plane. The z direction is a height direction of the optical elements 12.

Light (display light) emitted from the display device 20 is reflected by two side surfaces of each of the optical elements 12. In FIG. 2, the optical path of light reflected by the hatched optical element 12 is extracted for illustration. The light emitted from the display device 20 forms an image at a position that is plane-symmetrical to the display device 20 with respect to the mirror device 10, and an aerial image 30 is formed at that position. An observer can visually recognize the aerial image.

Figure 3:
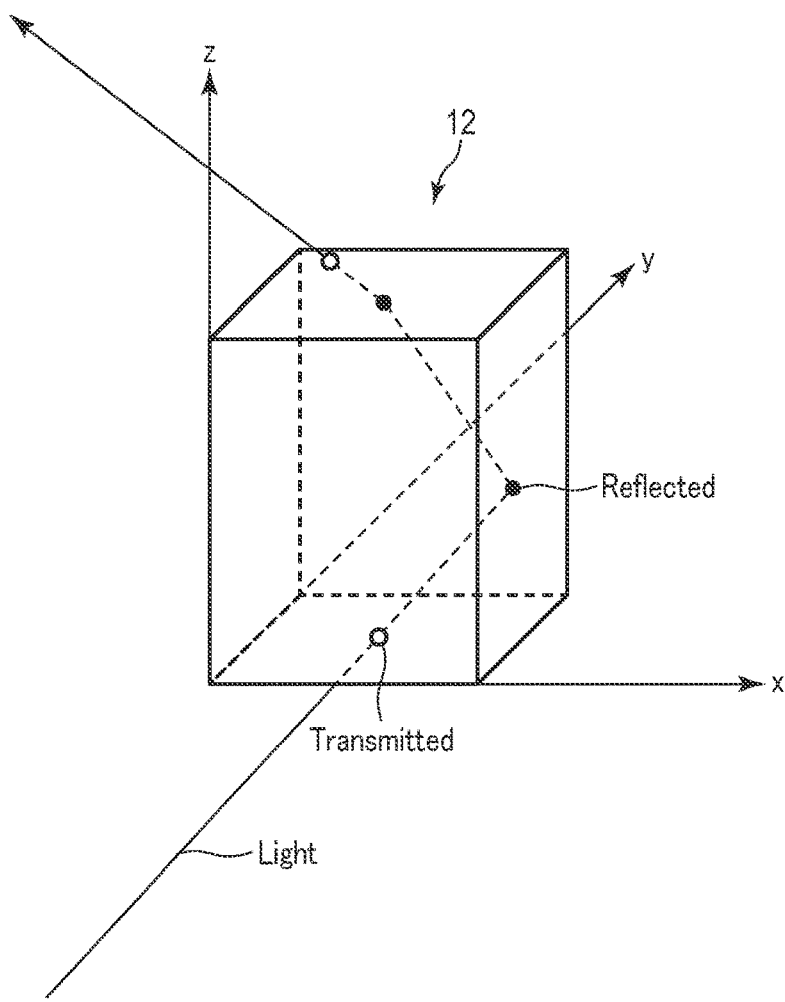
FIG. 3 is a schematic diagram illustrating a state of light that is reflected twice by a single optical element.
Figure 4:
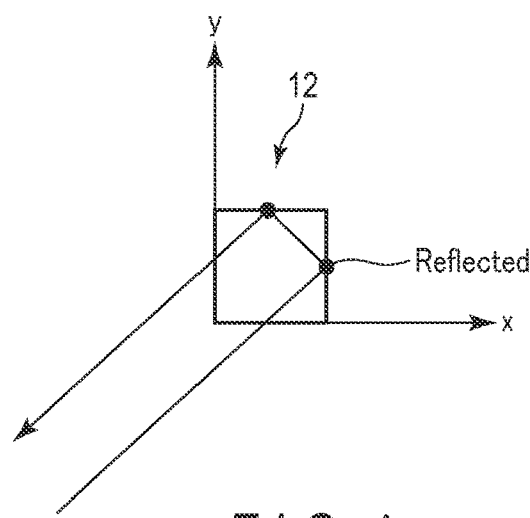
FIG. 4 is a diagram illustrating an optical path when the optical element in FIG. 3 is viewed from the z direction.
Figure 5:
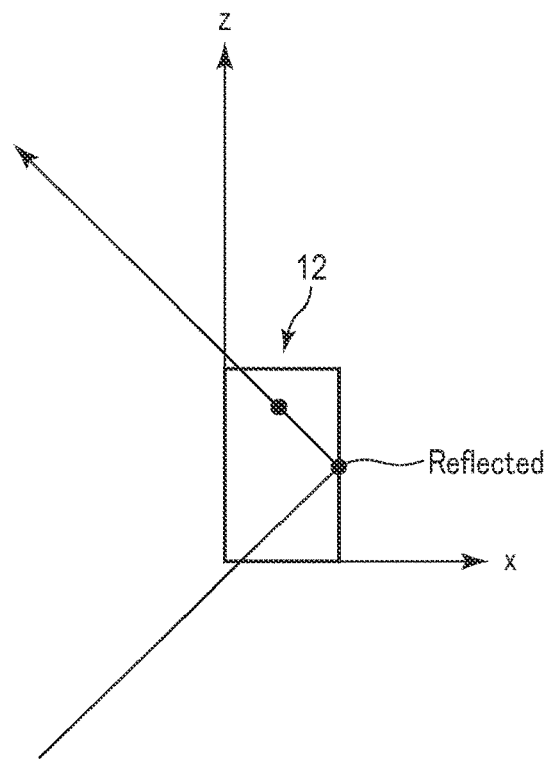
FIG. 5 is a diagram illustrating an optical path when the optical element in FIG. 3 is viewed from the y direction.
Figure 6:
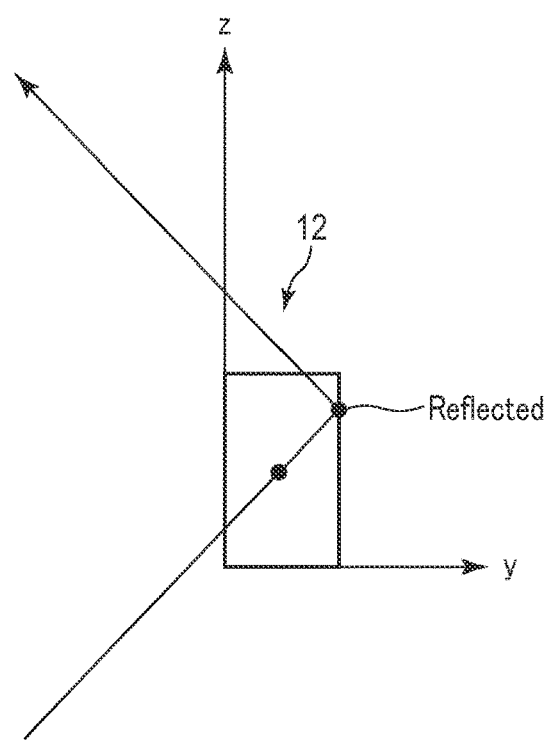
FIG. 6 is a diagram illustrating an optical path when the optical element in FIG. 3 is viewed from the x direction.

FIG. 3 is a schematic diagram illustrating a state of light that is reflected twice by a single optical element 12. FIG. 4 is a diagram illustrating an optical path when the optical element 12 is viewed from the z direction. FIG. 5 is a diagram illustrating an optical path when the optical element 12 is viewed from the y direction. FIG. 6 is a diagram illustrating an optical path when the optical element 12 is viewed from the x direction.

Light incident from a bottom surface of the optical element 12 is reflected by a first side surface, further reflected by a second side surface that is perpendicular to the first side surface, and then emitted from a top surface.

It should be noted that for light incident on a given side surface of the optical element 12, not all the components of the light are reflected by that side surface, and the light is divided into a reflective component and a transmissive component. The reflective component is a component of light reflected by the side surface at an angle of reflection corresponding to the incident angle, and the transmissive component is a component of light that is linearly transmitted through the side surface.

(Regarding Ghosts)

Figure 7:
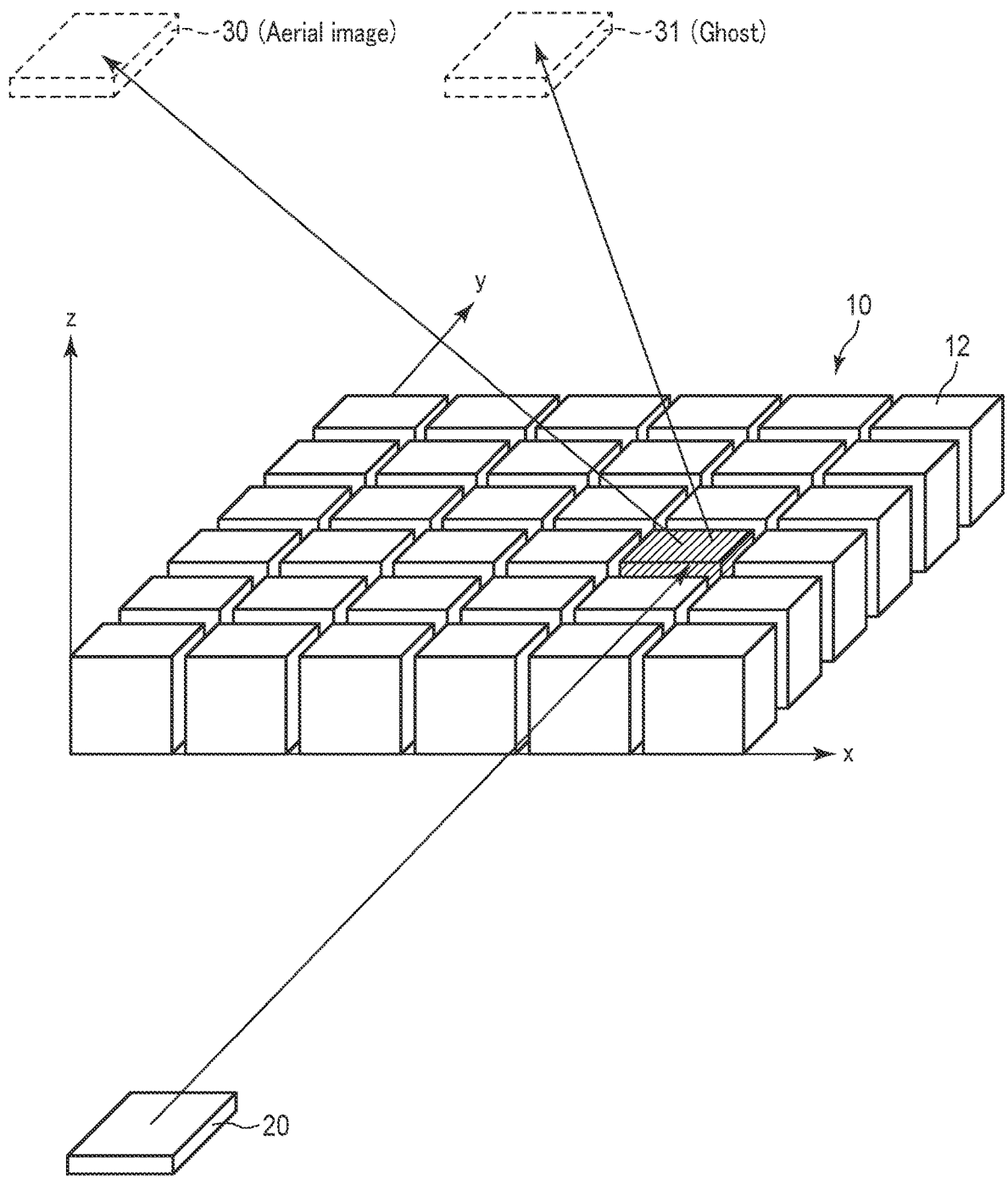
FIG. 7 is a schematic diagram illustrating a ghost displayed by the aerial display apparatus.

Next, a ghost that is formed at an unintended position will be described. A ghost is a double image that appears in the vicinity of the aerial image 30. FIG. 7 is a schematic diagram illustrating a ghost 31 displayed by the aerial display apparatus.

The ghost 31 is an image formed by light that is reflected only once (i.e., light that is not reflected twice) by the mirror device 10. The ghost 31 is formed at a position that is not plane-symmetrical to the display device 20 with respect to the mirror device 10.

Figure 8:
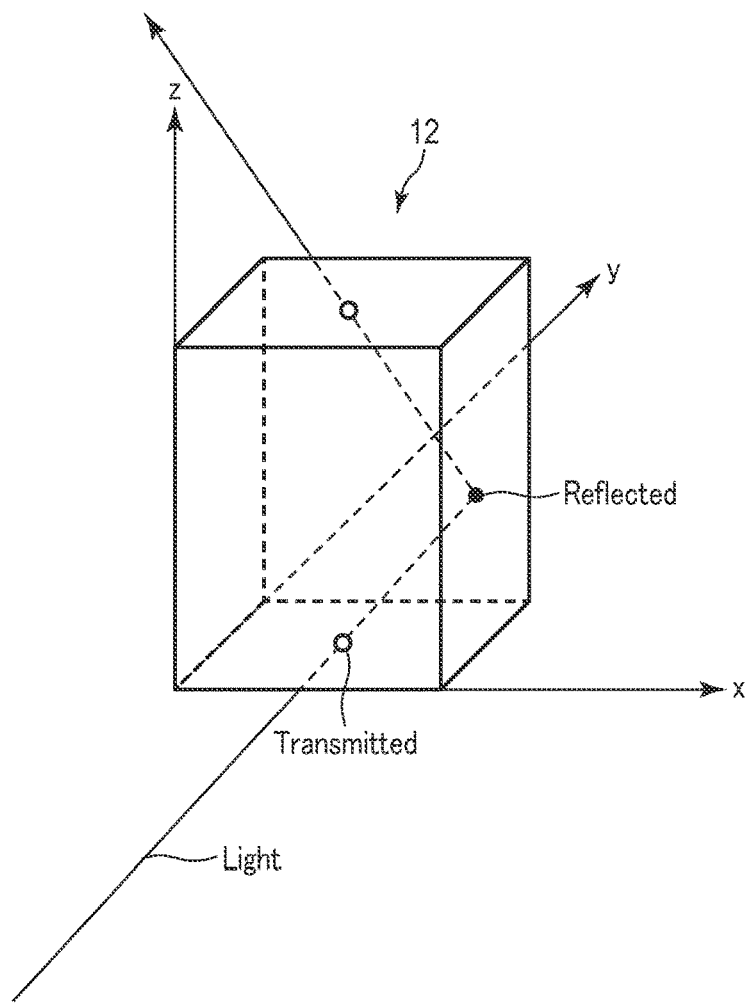
FIG. 8 is a schematic diagram illustrating a state of light that is reflected once by a single optical element.
Figure 9:
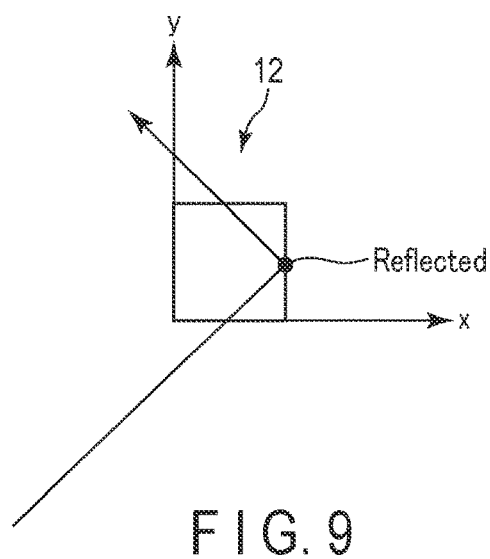
FIG. 9 is a diagram illustrating an optical path when the optical element in FIG. 8 is viewed from the z direction.
Figure 10:
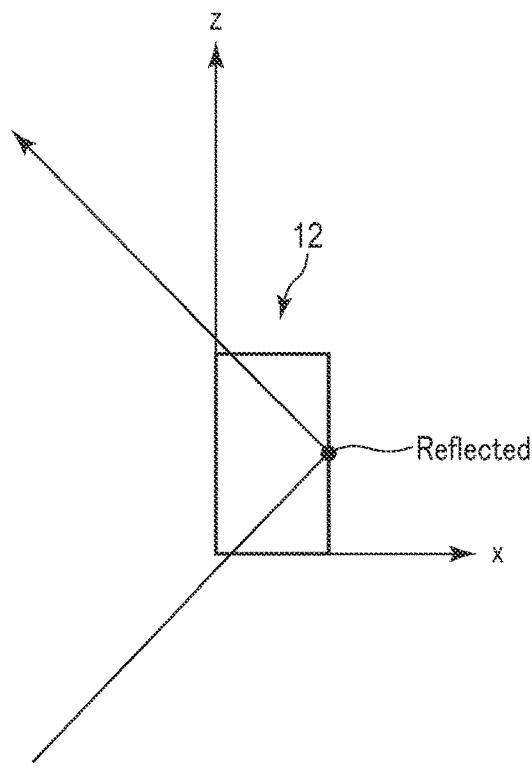
FIG. 10 is a diagram illustrating an optical path when the optical element in FIG. 8 is viewed from the y direction.
Figure 11:
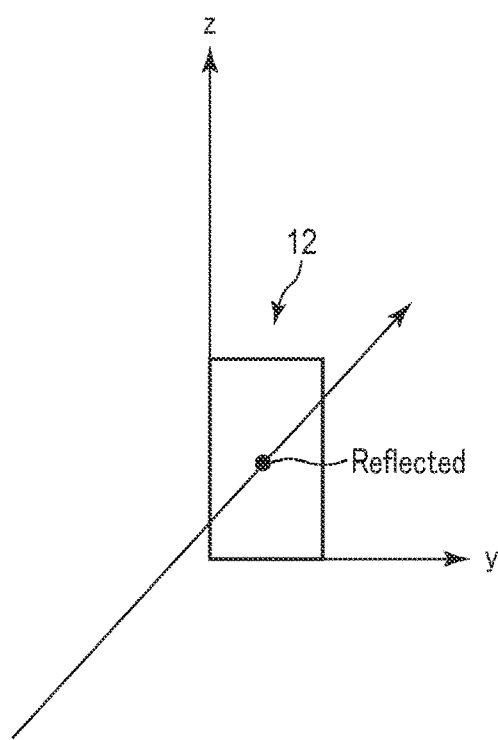
FIG. 11 is a diagram illustrating an optical path when the optical element in FIG. 8 is viewed from the x direction.

FIG. 8 is a schematic diagram illustrating a state of light reflected once by a single optical element 12. FIG. 9 is a diagram illustrating an optical path when the optical element 12 is viewed from the z direction. FIG. 10 is a diagram illustrating an optical path when the optical element 12 is viewed from the y direction. FIG. 11 is a diagram illustrating an optical path when the optical element 12 is viewed from the x direction.

Light incident from a bottom surface of the optical element 12 is reflected by a first side surface, and is then transmitted through a second side surface that is perpendicular to the first side surface. The light that travels along this path forms an image at a position that is not plane-symmetrical to the display device 20 with respect to the mirror device 10, thereby displaying a ghost 31.

(Regarding Unwanted Light)

Figure 12:
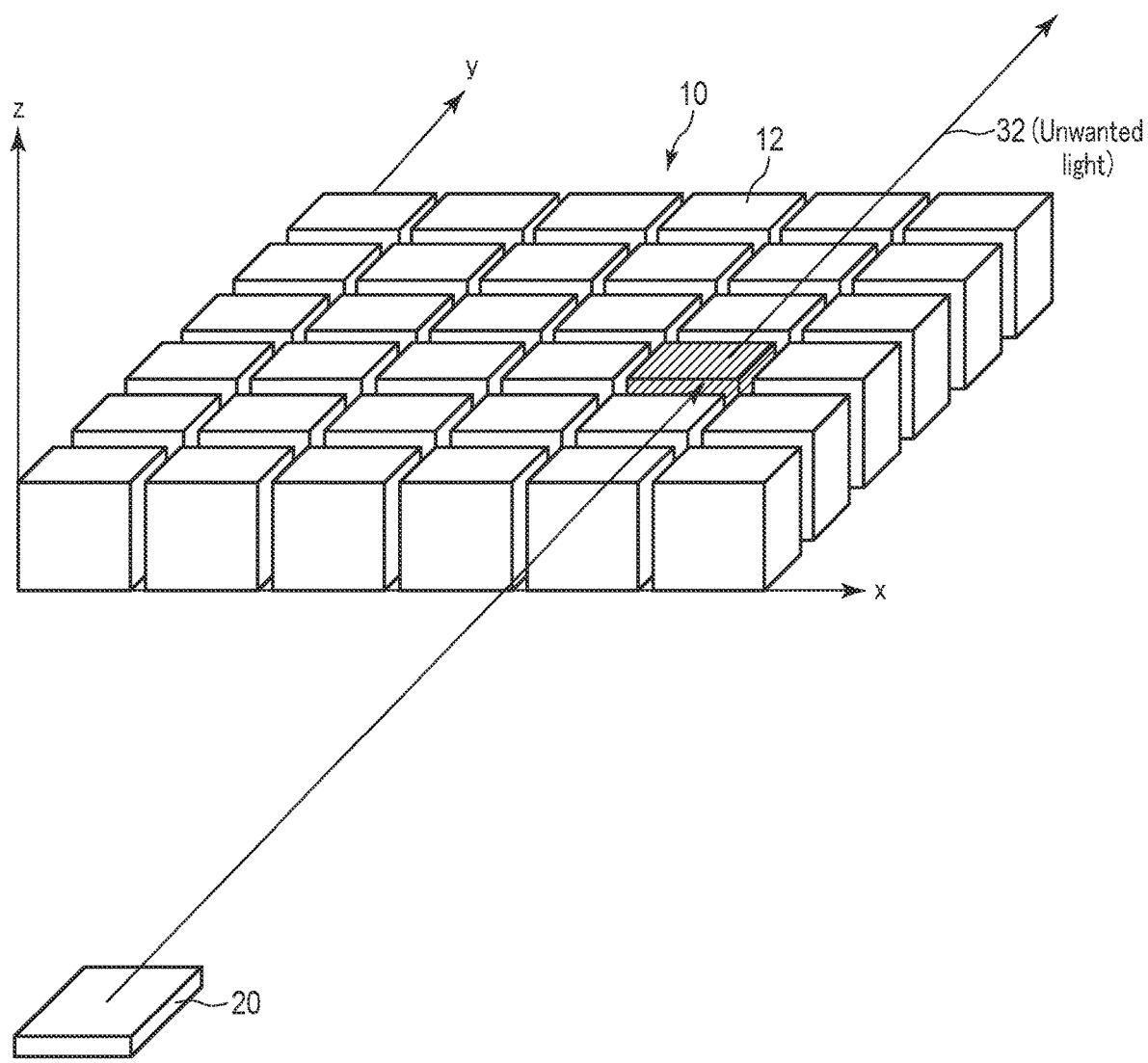
FIG. 12 is a schematic diagram illustrating unwanted light of the aerial display apparatus.

Next, unwanted light will be described. Unwanted light is a light component that does not contribute to formation of a real image. FIG. 12 is a schematic diagram illustrating unwanted light 32 of the aerial display apparatus.

The unwanted light 32 is light that is not reflected at all by the mirror device 10. The unwanted light 32 is linearly transmitted through the mirror device 10.

Figure 13:
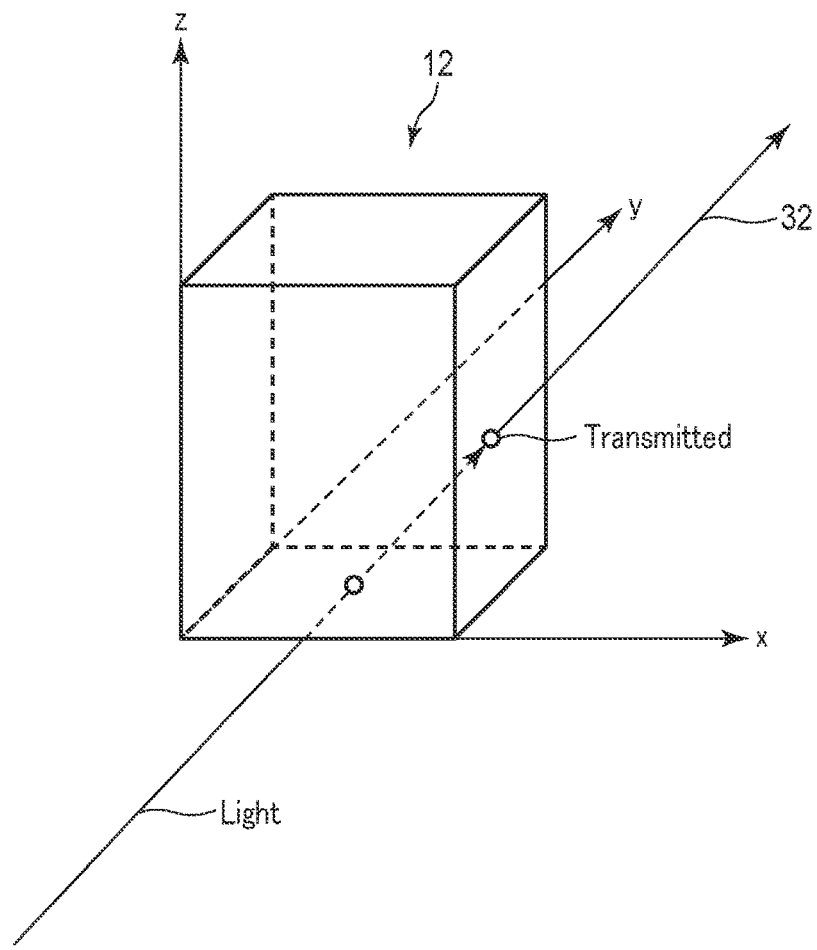
FIG. 13 is a schematic diagram illustrating a state of light that is not reflected at all by a single optical element.
Figure 14:
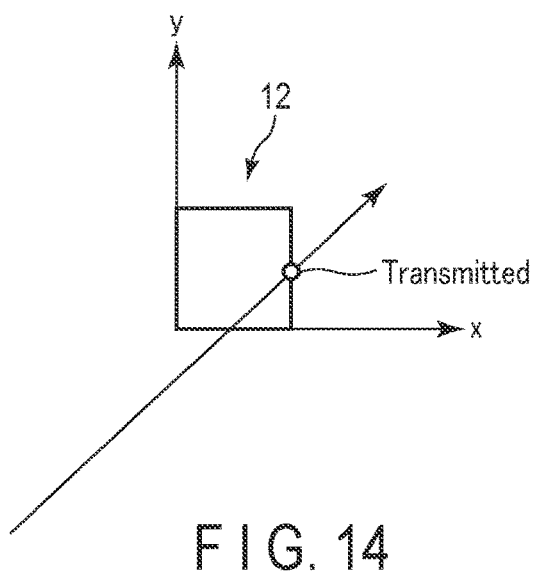
FIG. 14 is a diagram illustrating an optical path when the optical element in FIG. 13 is viewed from the z direction.
Figure 15:
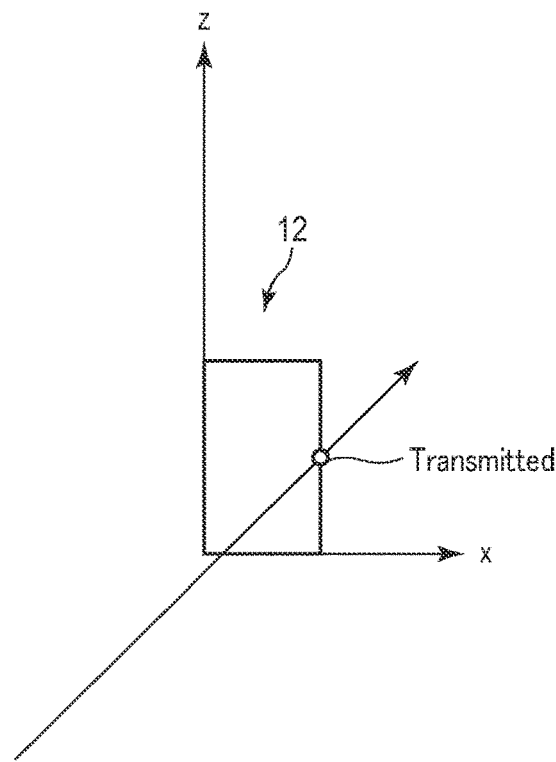
FIG. 15 is a diagram illustrating an optical path when the optical element in FIG. 13 is viewed from the y direction.
Figure 16:
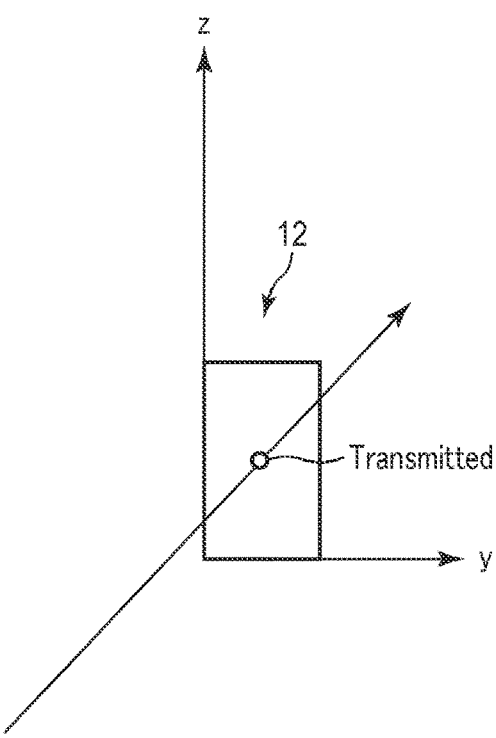
FIG. 16 is a diagram illustrating an optical path when the optical element in FIG. 13 is viewed from the x direction.

FIG. 13 is a schematic diagram illustrating a state of light that is not reflected at all by a single optical element 12. FIG. 14 is a diagram illustrating an optical path when the optical element 12 is viewed from the z direction. FIG. 15 is a diagram illustrating an optical path when the optical element 12 is viewed from the y direction. FIG. 16 is a diagram illustrating an optical path when the optical element 12 is viewed from the x direction.

The light incident from the bottom surface of the optical element 12 is not reflected by the first side surface, and is linearly transmitted through the first side surface.

The unwanted light 32 brightens the periphery of the aerial image 30. Due to the unwanted light 32, the contrast of the aerial image 30 is reduced.

[1-2] Configuration of Aerial Display Apparatus 1

Figure 17:
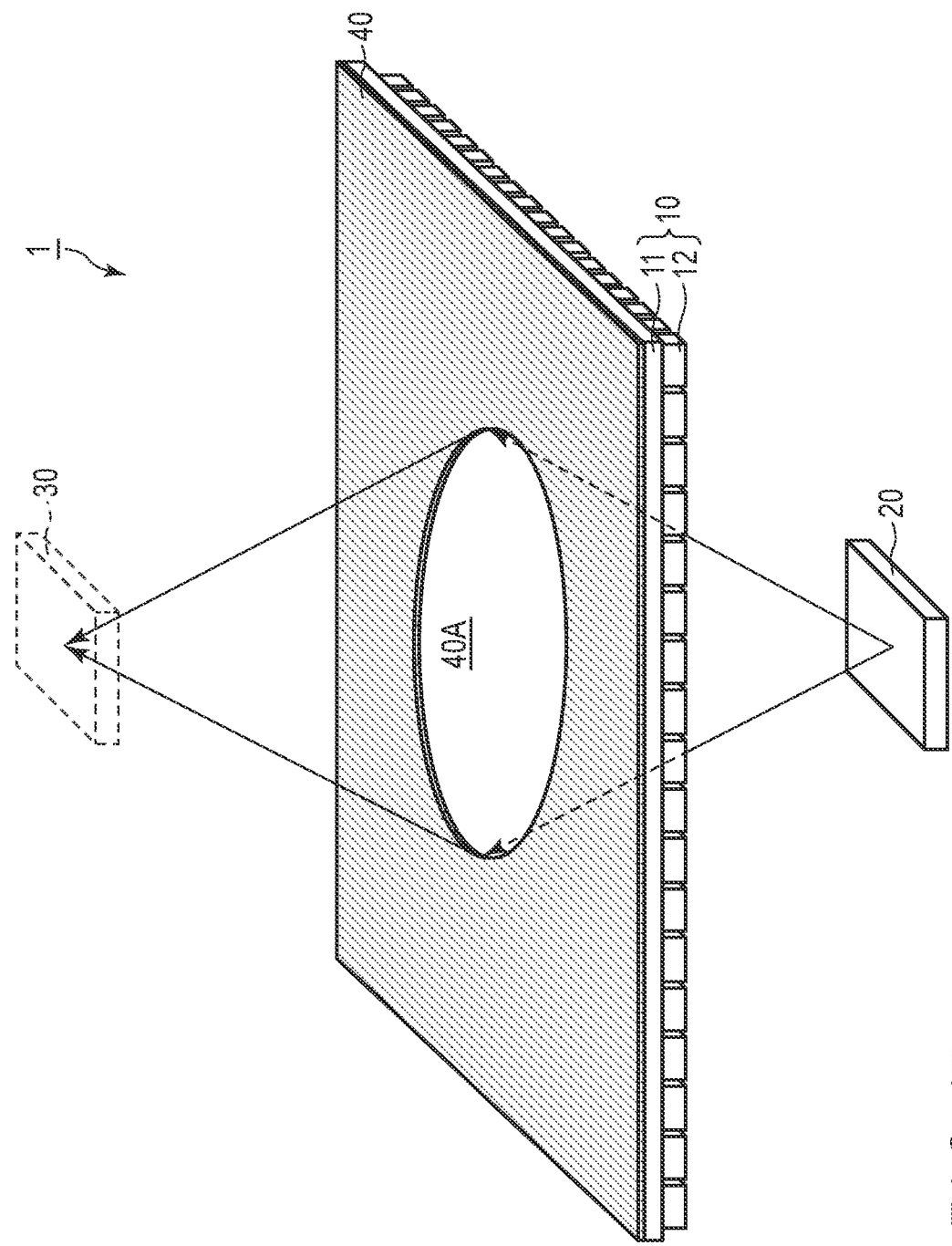
FIG. 17 is a perspective view of an aerial display apparatus according to a first embodiment.

Next, a configuration of an aerial display apparatus 1 according to a first embodiment will be described. FIG. 17 is a perspective view of the aerial display apparatus 1 according to the first embodiment.

The aerial display apparatus 1 includes a mirror device 10, a display device 20, and a light shielding film (light shielding member) 40. In FIG. 17, a plurality of devices constituting the aerial display apparatus 1 are shown as if they are floating; however, these devices are fixed at the illustrated positions by unillustrated support members. The same applies to the subsequent drawings.

The display device 20 includes a display surface, and displays an image on the display surface. The display surface of the display device 20 is disposed on the side of the mirror device 10. Various displays can be used as the display device 20; example configurations of the display device 20 include a liquid crystal display device, an organic electroluminescence (EL) display device, etc.

The mirror device 10 is disposed at a distance from the display device 20. Upon receiving display light from the display device 20, the mirror device 10 reflects the display light toward an opposite side of the display device 20. Thereby, the mirror device 10 forms the aerial image 30 at a position that is plane-symmetrical to the display device 20. The size (area) of the mirror device 10 is set to be larger than an area capable of receiving display light for forming the aerial image 30, namely, with a margin from the area capable of receiving the display light.

The mirror device 10 may be disposed in such a manner that the optical elements 12 face the display device 20, or the base member 11 faces the display device 20. FIG. 17 is a configuration example in which the optical elements 12 are disposed on the side of the display device 20, namely, a configuration example in which the mirror device 10 of FIG. 1 is disposed upside down.

The light shielding film 40 is provided so as to be in contact with the mirror device 10. The light shielding film 40 is, for example, adhered to the mirror device 10. The light shielding film 40 may be provided on the side of the base member 11 of the mirror device 10, or on the side of the optical elements 12.

The light shielding film 40 includes, at its center, an opening 40A. The opening 40A allows light that forms the aerial image 30 to pass through. The light shielding film 40 has a function of shielding the ghost and/or unwanted light. The light shielding film 40 is configured of, for example, a resin mixed with a black dye. Examples of the resin used for the light shielding film 40 include polyethylene terephthalate (PET).

The opening 40A is, for example, a circle. The opening 40A is set to have an area that allows display light for forming the aerial image 30 to be transmitted therethrough, and allows ghosts and/or unwanted light to be shielded. The area of the opening 40A is appropriately set in accordance with the size (area) of the display screen of the display device 20, the distance between the display device 20 and the mirror device 10, and the positional relationship between the display device 20 and the mirror device 10. The area of the opening 40A is, for example, larger than the area of the display device 20.

[1-3] Advantageous Effects of First Embodiment

As described in detail above, in the first embodiment, an aerial display apparatus 1 includes a display device 20 that displays an image, a mirror device 10 that reflects display light from the display device 20, and a light shielding film (light shielding member) 40 provided on the mirror device 10 on an opposite side of the display device 20. The mirror device 10 includes a plurality of optical elements 12 each including two reflective surfaces that are orthogonally disposed, and forms an aerial image 30 at a position that is plane-symmetrical to the display device 20. The light shielding film 40 includes an opening 40A that allows a portion of incident light to pass through, and shields light incident on a region other than the opening 40A.

According to the first embodiment, since the aerial display apparatus 1 is capable of shielding light that forms a ghost, it is possible to prevent the ghost from being visually recognized by the observer. Further, since the aerial display apparatus 1 is capable of shielding unwanted light, the contrast of the aerial image 30 can be improved. As a result, it is possible to improve the display quality of the aerial display apparatus 1.

[2] Second Embodiment

In a second embodiment, a light shielding member for shielding ghosts and/or unwanted light is disposed at a distance from a mirror device 10.

Figure 18:
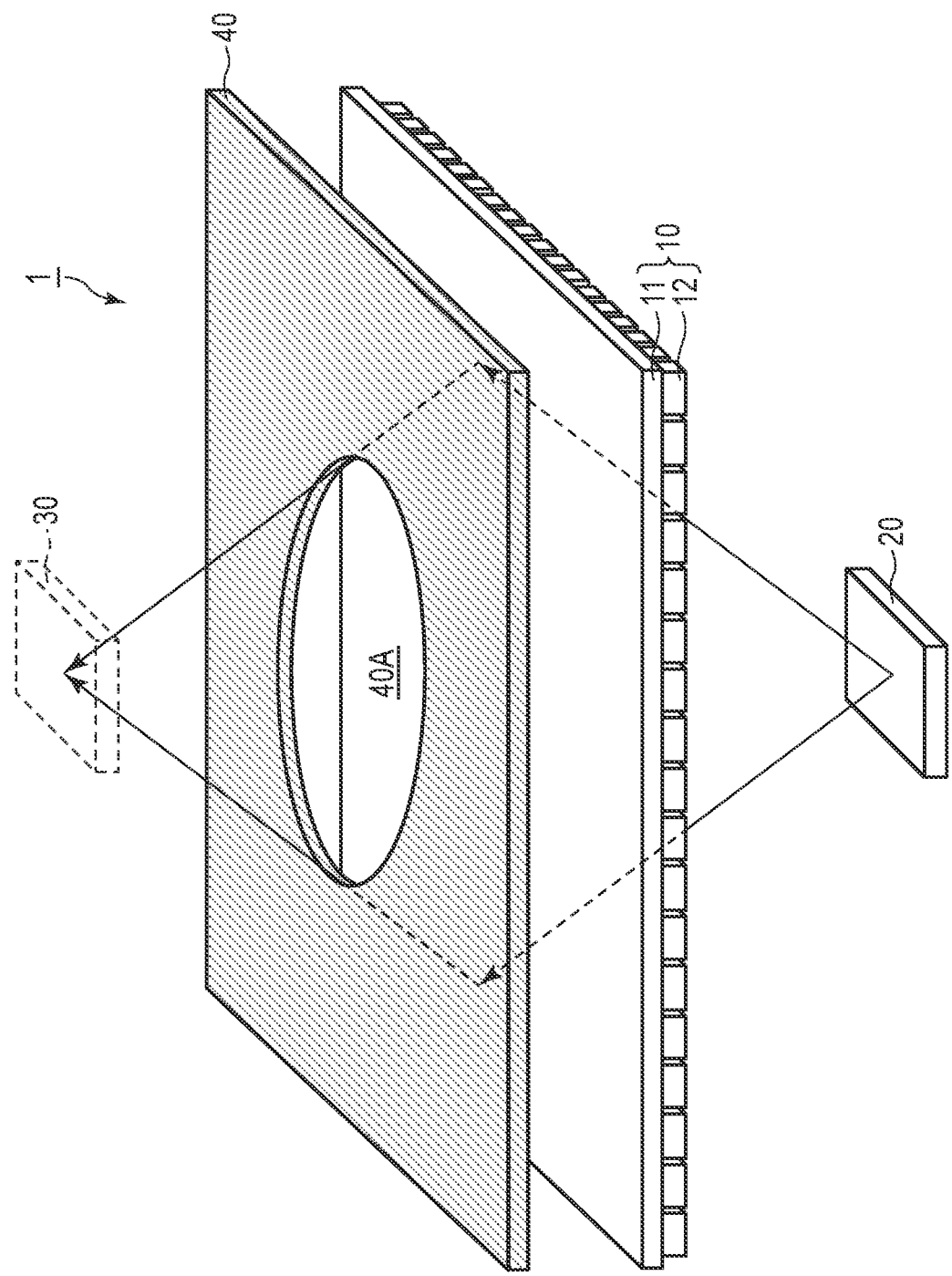
FIG. 18 is a perspective view of an aerial display apparatus according to a second embodiment.

FIG. 18 is a perspective view of an aerial display apparatus 1 according to the second embodiment. The aerial display apparatus 1 includes a mirror device 10, a display device 20, and a light shielding plate (light shielding member) 40.

The light shielding plate 40 is disposed at a distance from the mirror device 10 on an opposite side of the display device 20 with respect to the mirror device 10. The light shielding plate 40 is configured of, for example, a resin mixed with a black dye. The light shielding plate 40 has a function of shielding the ghost and/or unwanted light.

According to the second embodiment, the light shielding plate 40 is capable of shielding a larger number of light components other than the light for forming the aerial image 30. It is thereby possible to shield ghosts and/or unwanted light.

[3] Third Embodiment

In a third embodiment, ghosts and/or unwanted light are shielded by using a light limiting device that allows only light which has an angle of emission that falls within a predetermined range to be transmitted therethrough.

Figure 19:
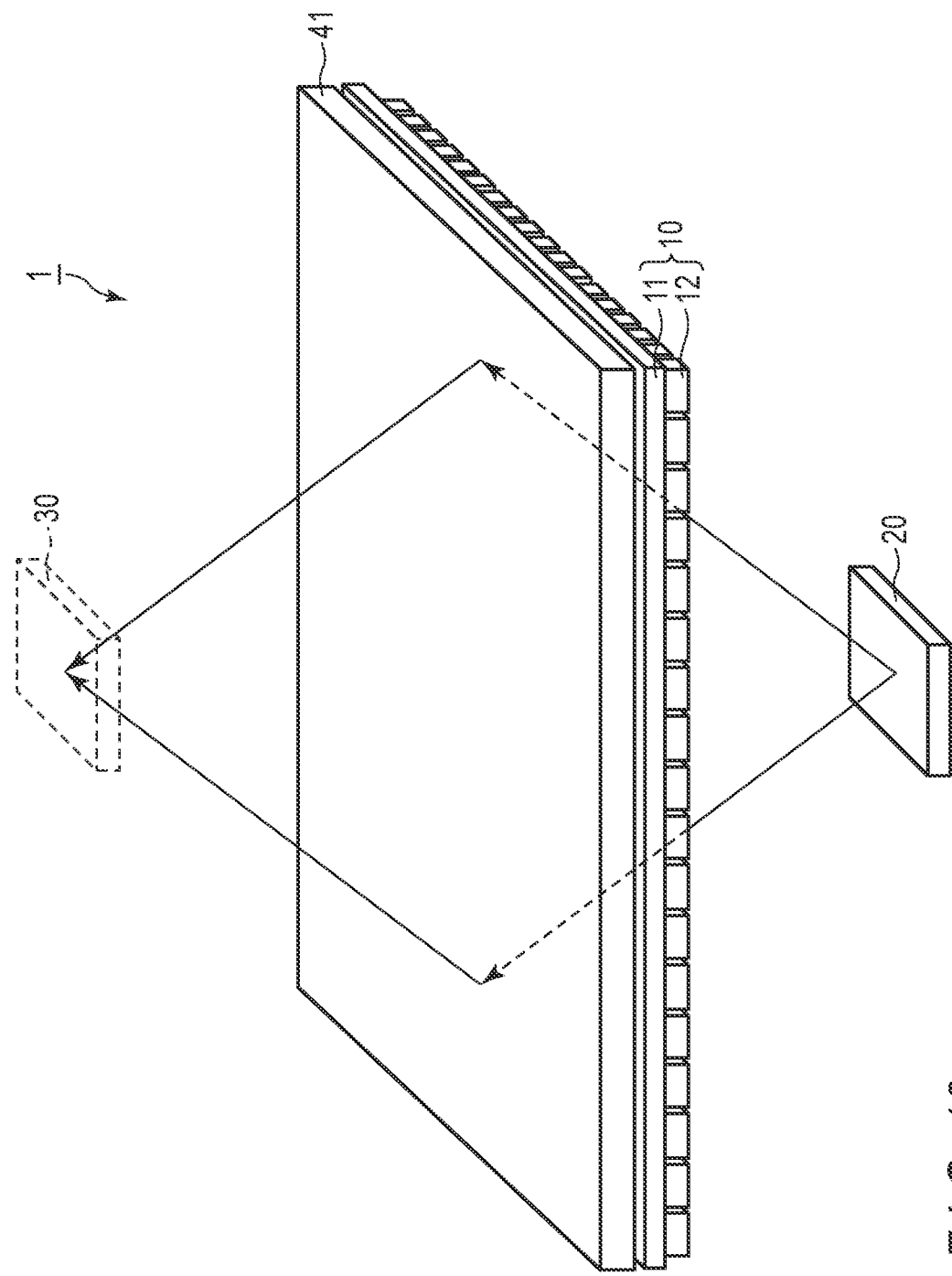
FIG. 19 is a perspective view of an aerial display apparatus according to a third embodiment.

FIG. 19 is a perspective view of an aerial display apparatus 1 according to the third embodiment. The aerial display apparatus 1 includes a mirror device 10, a display device 20, and a light limiting device 41.

The light limiting device 41 is disposed on an opposite side of the display device 20 with respect to the mirror device 10. The light limiting device 41 may be disposed in contact with the mirror device 10, or at a distance from the mirror device 10.

The light limiting device 41 has a function of allowing a light component of light incident thereon which has an angle of emission that falls within a predetermined range to be transmitted therethrough, and of shielding a light component of the incident light which has an angle of emission that falls outside the predetermined range. That is, the light limiting device 41 has a function of allowing display light for forming an aerial image 30 to be transmitted therethrough, and of shielding ghosts and/or unwanted light.

Figure 20:
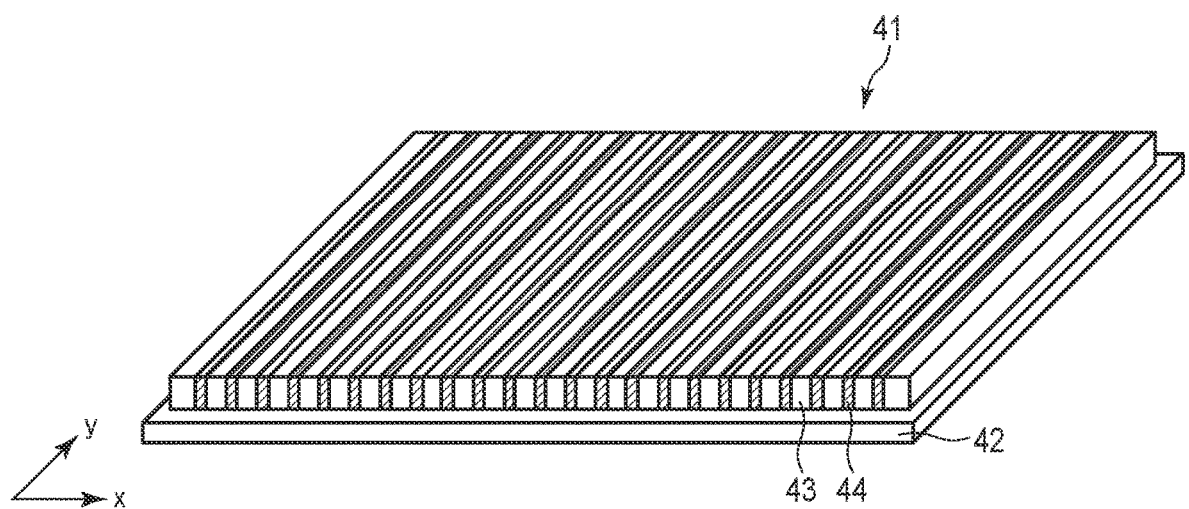
FIG. 20 is a perspective view of a light limiting device shown in FIG. 19.

FIG. 20 is a perspective view of the light limiting device 41. The light limiting device 41 includes a base member 42, a plurality of transmissive layers 43, and a plurality of light shielding layers 44. The transmissive layers 43 and the light shielding layers 44 are disposed in an alternating manner, and adjacent layers are in contact with each other. The transmissive layers 43 and the light shielding layers 44 are disposed side by side in the x direction, each extending in the y direction. The base member 42 and the transmissive layers 43 allow light to be transmitted therethrough. The base member 42 and the transmissive layers 43 are configured of a transparent resin. The light shielding layers 44 shield light. The light shielding layers 44 are configured of, for example, a resin mixed with a black dye. The angle of emission of the light limiting device 41 is set within a range equal to or greater than 0 degrees and equal to or smaller than 60 degrees on each of the right and left sides, with respect to the normal. More desirably, the angle of emission of the light limiting device 41 is set within a range equal to or greater than 0 degrees and equal to or smaller than 45 degrees on each of the right and left sides, with respect to the normal. The angle of emission is an angle from the normal of the light limiting device 41.

According to the third embodiment, it is possible to shield ghosts and/or unwanted light. Thereby, it is possible to improve the display quality of the aerial display apparatus 1.

The light limiting device 41 may be disposed between the display device 20 and the mirror device 10. It may be disposed, for example, in contact with the mirror device 10 on the side of the display device 20. In the present embodiment, light that may become a ghost and/or unwanted light can be shielded before it enters the mirror device 10. Thereby, it is possible to improve the display quality of the aerial display apparatus 1.

Moreover, the light limiting device 41 shown in the third embodiment can be additionally applied to the configurations of the first and second embodiments.

[4] Fourth Embodiment

In the fourth embodiment, a liquid crystal display device is used as a display device. In addition, the light emitted from a back light is limited to a light component which has an angle of emission that falls within a predetermined range, using a light limiting device 41.

Figure 21:
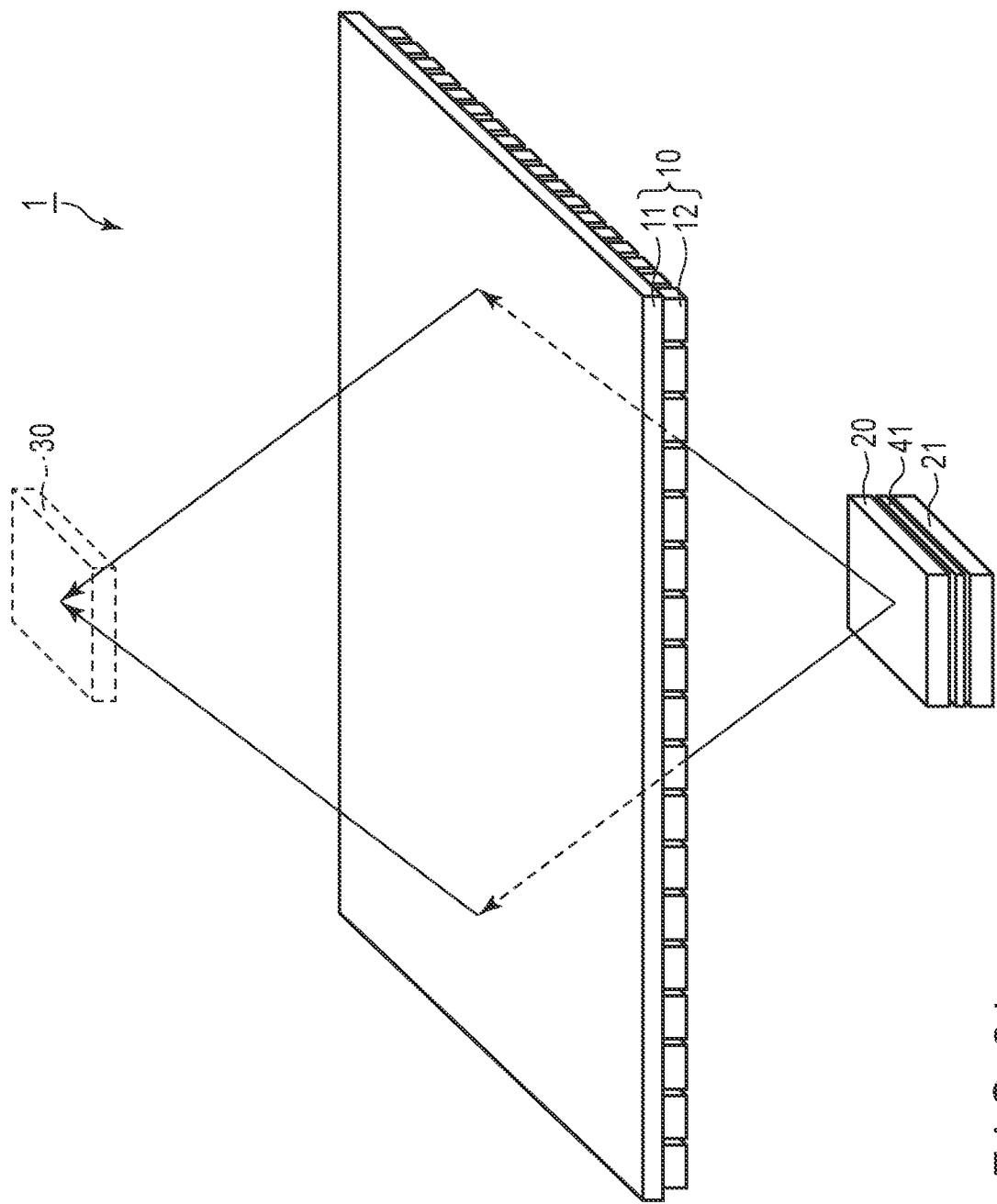
FIG. 21 is a perspective view of an aerial display apparatus according to a fourth embodiment.

FIG. 21 is a perspective view of an aerial display apparatus 1 according to the fourth embodiment. The aerial display apparatus 1 includes a mirror device 10, a liquid crystal display device (light modulating device) 20, a light source unit (back light) 21, and a light limiting device 41.

The back light 21 produces illumination light and emits the illumination light toward the liquid crystal display device 20. The back light 21 is configured of a surface light source.

The light limiting device 41 is disposed between the back light 21 and the liquid crystal display device 20. The light limiting device 41 has a function of allowing a light component of light incident thereon which has an angle of emission that falls within a predetermined range to be transmitted therethrough, and of shielding a light component of the incident light which has an angle of emission that falls outside the predetermined range. That is, the light limiting device 41 has a function of allowing illumination light for forming an aerial image 30 to be transmitted therethrough, and of shielding in advance illumination light that causes ghosts and/or unwanted light. The structure of the light limiting device 41 of FIG. 21 is the same as the light limiting device 41 of FIG. 20, except for the difference in size.

The liquid crystal display device 20 receives illumination light that is transmitted through the light limiting device 41. The liquid crystal display device 20 allows illumination light to be transmitted therethrough, and performs light modulation. The liquid crystal display device 20 displays a desired image on its display surface. A driving mode of the liquid crystal display device 20 is not particularly limited, and a twisted nematic (TN) mode, a vertical alignment (VA) mode, a homogeneous mode, or the like can be used.

According to the fourth embodiment, it is possible to shield the illumination light that causes ghosts and/or unwanted light at a stage before the display light enters the mirror device 10. Thereby, it is possible to improve the display quality of the aerial display apparatus 1.

The light limiting device 41 may be disposed on an opposite side of the back light 21 with respect to the display device 20. The light limiting device 41 having substantially the same size as the display device 20 may be disposed in contact with or at a distance from the display surface of the display device 20.

When a self-luminous display device such as an organic EL display device is used, the light limiting device 41 may be disposed in contact with or at a distance from the display surface of the display device.

Moreover, the light limiting device 41 shown in the fourth embodiment can be additionally applied to the configurations of the first and second embodiments.

[5] Fifth Embodiment

In a fifth embodiment, a region of the mirror device 10 in which a plurality of optical elements 12 are disposed is reduced to a size capable of reflecting light that contributes to formation of an aerial image. The light that causes ghosts and/or unwanted light is suppressed from being diffused by the optical element 12.

Figure 22:
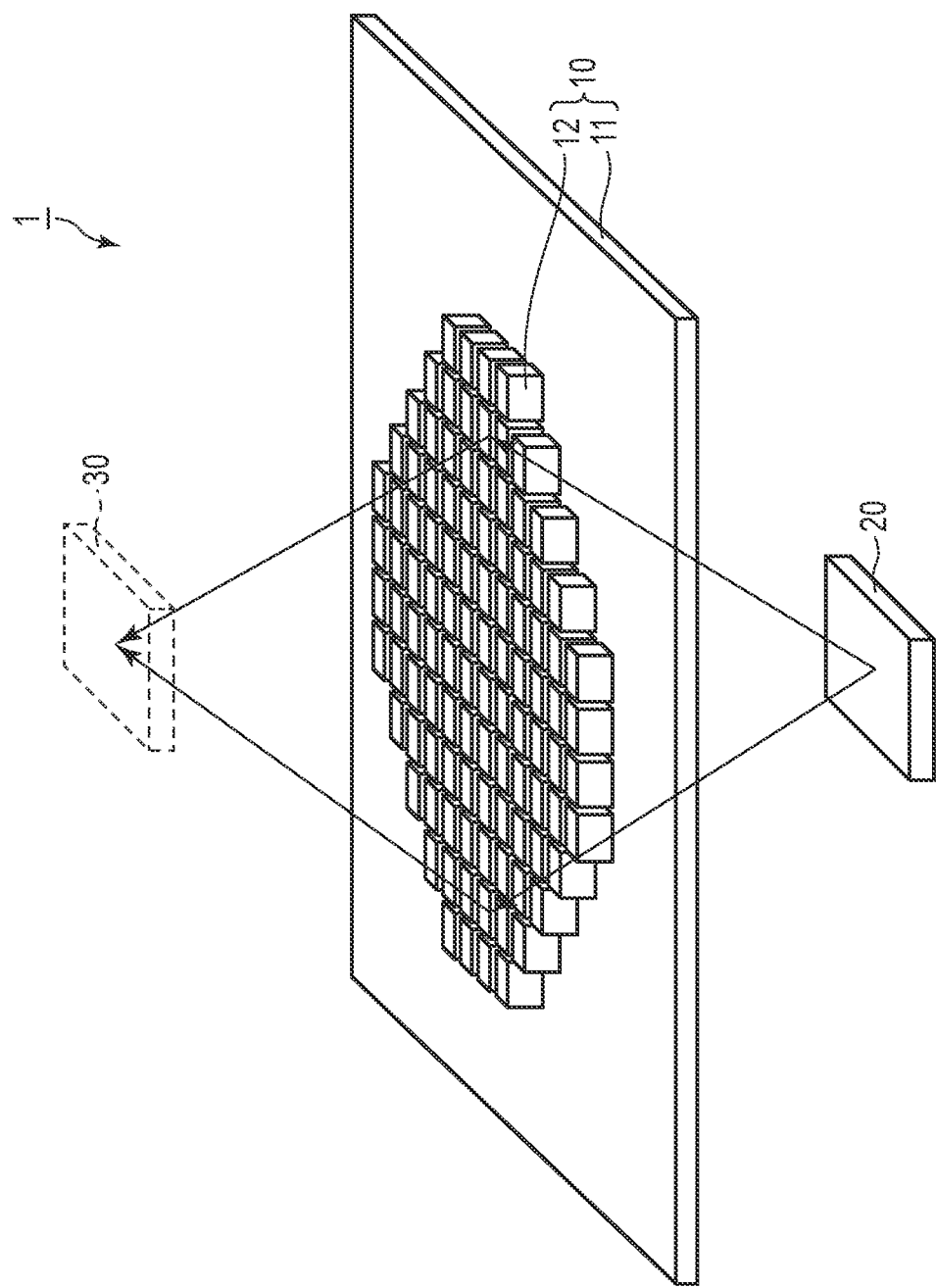
FIG. 22 is a perspective view of an aerial display apparatus according to a fifth embodiment.

FIG. 22 is a perspective view of an aerial display apparatus 1 according to the fifth embodiment. The aerial display apparatus 1 includes a mirror device 10 and a display device 20.

The mirror device 10 includes a base member 11 and a plurality of optical elements 12 provided on the base member 11. In the example of FIG. 22, the optical elements 12 are disposed on the base member 11 on an opposite side of the display device 20 with respect to the base member 11. As a matter of course, a plurality of optical elements 12 may be disposed so as to face the display device 20.

A region in which the optical elements 12 are disposed is limited to a central portion of the base member 11. The region in which the optical elements 12 are disposed is reduced to a size capable of reflecting light that contributes to formation of an aerial image 30. Thereby, it is possible to suppress the display light emitted from the display device 20 from being diffused in a region other than the region in which the optical elements 12 are disposed. As a result, it is possible to improve the display quality of the aerial display apparatus 1.

The mirror device 10 of the fifth embodiment can be applied to the first to fourth embodiments.

In each of the embodiments, the mirror device 10 is configured to include a plurality of optical elements 12 each having a rectangular parallelepiped shape. The structure of the mirror device 10 is not limited thereto. The mirror device 10 may be configured, for example, to include a plurality of holes in a transparent base member, each hole having two reflective surfaces that are orthogonally disposed. Specifically, the mirror device 10 is configured in such a manner that a plurality of holes each having a square or rectangular planar shape are disposed in a matrix in a transparent base member. In other words, the optical element that reflects light twice may be either convex or concave.

The present invention is not limited to the above-described embodiments, and can be modified in practice, without departing from the gist of the invention. Furthermore, the embodiments described above include inventions at various stages, and various inventions can be configured by an appropriate combination of a plurality of components disclosed in a single embodiment or an appropriate combination of components disclosed in different embodiments. For example, if the object of the invention is achieved and advantages of the invention are attained even after some of the structural elements are deleted from all the structural elements disclosed in the embodiment, the structure made up of the resultant structural elements may be extracted as an invention.

The invention claimed is:
1. An aerial display apparatus comprising:
a display device which displays an image;
a mirror device which includes a plurality of optical elements each including two reflective surfaces that are orthogonally disposed, which reflects display light from the display device, and which forms an aerial image at a position that is plane-symmetrical to the display device; and a light shielding member which is disposed on an optical path between the display device and the aerial image, which includes an opening that allows a portion of incident light to pass through, and which shields light incident on a region other than the opening, wherein an area of the opening is smaller than an area of the mirror device.

2. The aerial display apparatus according to claim 1, wherein the light shielding member is disposed on the mirror device on an opposite side of the display device with respect to the mirror device.

3. The aerial display apparatus according to claim 1, wherein the light shielding member is disposed at a distance from the mirror device on an opposite side of the display device with respect to the mirror device.

4. The aerial display apparatus according to claim 1, wherein the mirror device includes a transparent base member, and the optical elements are arranged in a matrix on the base member.

5. The aerial display apparatus according to claim 4, wherein the light shielding member is provided on the base member.

6. The aerial display apparatus according to claim 1, wherein the opening is a circle.

7. The aerial display apparatus according to claim 1, wherein each of the optical elements is formed of a cubic or rectangular parallelepiped shape.

8. An aerial display apparatus, comprising:

a display device which displays an image;

a mirror device which includes a plurality of optical elements each including two reflective surfaces that are orthogonally disposed, which reflects display light from the display device, and which forms an aerial image at a position that is plane-symmetrical to the display device; and a light limiting device which is disposed on an optical path between the display device and the aerial image, and which allows a light component of incident light having an angle of emission that falls within a predetermined range to be transmitted therethrough, wherein the light limiting device includes a transparent base member, a plurality of transmissive layers that are transparent and that are provided on the base member, and a plurality of light shielding layers that are provided on the base member and that shield light, and the transmissive layers and the light shielding layers, each extending in a first direction, are arranged in an alternating manner.

9. The aerial display apparatus according to claim 8, wherein the light limiting device is disposed on an opposite side of the display device with respect to the mirror device.

10. The aerial display apparatus according to claim 8, wherein the display device includes a light source unit that produces light and a light modulating device that modulates the light from the light source unit, and the light limiting device is disposed between the light source unit and the light modulating device.

11. The aerial display apparatus according to claim 8, wherein the mirror device includes a transparent base member, and the optical elements are arranged in a matrix on the base member.

12. The aerial display apparatus according to claim 8, wherein each of the optical elements is formed of a cubic or rectangular parallelepiped shape.

13. The aerial display apparatus according to claim 1, wherein the light shielding member includes a black resin.

14. The aerial display apparatus according to claim 8, wherein the light limiting device allows a light component having an angle range with respect to a normal of the base member to be transmitted therethrough.

* * * * *